Aug. 18, 1953  W. A. ALEXANDER  2,649,579
DETECTOR FOR SEISMIC EXPLORATION
Filed Feb. 1, 1950

Warren A. Alexander Inventor

Aug. 18, 1953  W. A. ALEXANDER  2,649,579
DETECTOR FOR SEISMIC EXPLORATION
Filed Feb. 1, 1950  3 Sheets-Sheet 3

Warren A. Alexander, Inventor
By W. O. T. Hilman, Attorney

Patented Aug. 18, 1953

2,649,579

UNITED STATES PATENT OFFICE 2,649,579

DETECTOR FOR SEISMIC EXPLORATION

Warren A. Alexander, Tulsa, Okla., assignor to Standard Oil Development Company, a corporation of Delaware Application February 1, 1950, Serial No. 141,660

4 Claims. (Cl. 340—17)

The present invention relates to an improved type of portable seismometer, or geophone, for seismic exploration. More particularly, it relates to a portable seismometer of the condenser or capacitor type wherein seismic vibrations cause minute changes in the spacing of elongated flexible conductors comprising the plates of the capacitor, the changes being detected by a suitable circuit as will be more fully described hereinafter.

One well-known technique of exploration for oil or other mineral deposits comprises seismic prospecting or reflection seismography wherein a hole is drilled into the earth and an explosive charge or other means of producing an artificial shock is placed in the hole. The shock is initiated and the seismic waves traveling through the earth are detected at various points on the surface of the earth by means of sensitive pick-ups or geophones which translate the detected waves into electrical impulses which after suitable amplification can be recorded on a seismograph.

Usually the geophones are placed in line with the shot point and are more or less evenly spaced from each other and from the shot point. Geophone stations will in general be from about 100 feet to 500 feet apart in a straight line. Each geophone is connected through a suitable cable to a recording station, usually a field truck, provided with seimograph instruments.

Conventionally, a seismograph record is obtained by means of a number of moving coil galvanometers each one of which has a mirror attached thereto, the galvanometers being arranged in a battery in connection with a source of light in such relation to a moving strip of sensitized paper or film that there will be recorded on the paper or film a plurality of wave forms or traces representative of the seismic waves that have been picked up by the individual geophones, suitably amplified, and fed to the galvanometers. Many seismograph instruments are capable of recording as many as 24 or 36 individual traces simultaneously. The strip of paper or film is moved longitudinally at a substantially constant speed and is provided with suitable timing marks so that when the seismograph record or seismogram is later examined it is possible to determine the length of time required for the arrival of seismic waves at any particular point on the earth's surface either directly from the source or by reflection from underlying strata.

The making of seismograph records in the manner above referred to is of value in that it gives information regarding the nature of the earth's subsurface, based on the principle that part of the energy of the artificial seismic shock will travel downwardly and be reflected back toward the surface by various more or less well-defined substrata, and that this reflected energy will be detected by the geophones and be recorded on the seismograph record. Hence, the desirability of placing on one record the traces of as many geophone locations as is practical, since a reflection from a well-defined substratum will appear on the record as a wave form of increased amplitude on all of the traces in some definite time relation, permitting the reflection to be "lined up" on the record.

In order to increase the effectiveness of the records it has become frequent practice to employ a plurality of geophones at each station, all tied to one trace on the record. This practice has many advantages, including the cancelling out of near-surface anomalies. For example, if only a single geophone is used and it happens to be placed near a buried stump or boulder, an anomalous travel time may be obtained for seismic waves reaching that geophone, whereas if 30 or 50 geophones are laid out and all tied to the same trace, anomalous signals will be cancelled out and the reflected wave will be picked up by the majority of the geophones. Also, if a plurality of geophones are laid out in the direction of the line of spread of the geophone stations and several geophones are tied to the same trace the group of geophones will act as a directional receiver since signals that are not lined up will tend to cancel out, whereas nearly plane wave fronts, representing reflections from substrata, will arrive at all of the geophones at substantially the same time. Furthermore a plurality of geophones tied together in this manner will aid in discriminating against disturbing background noise, erally referred to as "wind noise" and "ground unrest"; thus resulting in improved presentation of the reflected signal. A further result will be that weaker reflected signals will be discernable, or conversely, smaller initiating explosive charges may be employed to give equal efficiency in detecting reflecting layers.

It is evident that although the use of a plurality of geophones at each geophone station produces many advantages, the practice does add to the time and labor involved for the making of each record, as well as to the investment cost. It is accordingly one object of the present invention to provide a single geophone which will replace such a plurality of geophones at each station. Another object is to provide a single instrument which will in effect act as an infinite number of geophones placed side by side. It is a further object of the invention to provide a seismometer capable of picking up an integrated signal representative of a true reflected wave front of seismic energy and to reject or cancel out spurious signals. Still another object is to provide an improved seismometer of the capacitor type.

The nature and objects of the invention and the manner in which it is to be performed will be readily apparent from the ensuing description and from the accompanying drawing in which.

Figure 1:
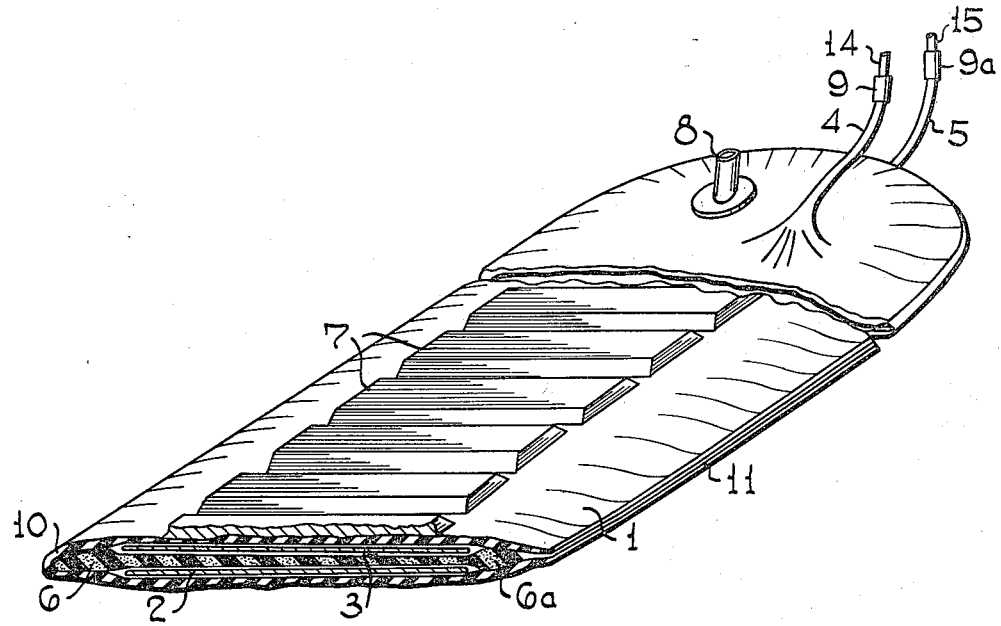
Fig. 1 is a perspective view of one embodiment of the seismometer of this invention with one end of the device cut away to show a cross-section thereof.

With specific reference to Fig. 1, which shows portions of the geophone device in a perspective view, a supporting body is provided consisting of an elongated flexible tube 1 of fairly flat or slightly oval cross section having an interior space 6. Embedded in or attached to the bottom wall of the tube is a thin flat elongated strip of conductor material 2, such as a ribbon or screen of flexible metal e. g., aluminum or lead foil. Alternatively the conductor material may comprise a coating or layer of carbon for example, although metal strips are more convenient. A similar strip 3 is attached to or embedded in the top wall of the tube so that the two conductor strips will be in close proximity but nevertheless electrically separated and thus in combination act as an electrical condenser. Suitably, the two conductor strips may be placed about 1/8" to 1/2" apart and be about 1" to several inches in width. In some instances widths of a foot or more may be practical. Conveniently the tube can be constructed of one flat piece of material with the two metal strips 2 and 3 attached to the proper areas and then folded along one edge 10 and sealed along the other edge.

The interior space 6 of the tube contains a non-liquid non-conducting elastic medium which may be a thin layer of sponge rubber 6a, for example. Alternatively the elastic medium may comprise air or other gas under slight pressure to ensure proper separation of the two conductor strips. Tube 1 may conveniently be made of rubber, vinyl resin or other gas-impermeable material. The gas pressure within the tube will usually need to be only slightly above atmospheric, and pressures of more than 5 lbs. per sq. in. above atmospheric will rarely be necessary. Conveniently gas for filling the tube may be introduced through a valve 8 similar to the valve provided on the inner tube of an automobile tire. Use of this type of valve permits periodic checks on the gas pressure within the tube so that if the gas pressure changes during the day as a result of temperature variations gas may be added to or removed from the tube conveniently.

Figure 2:
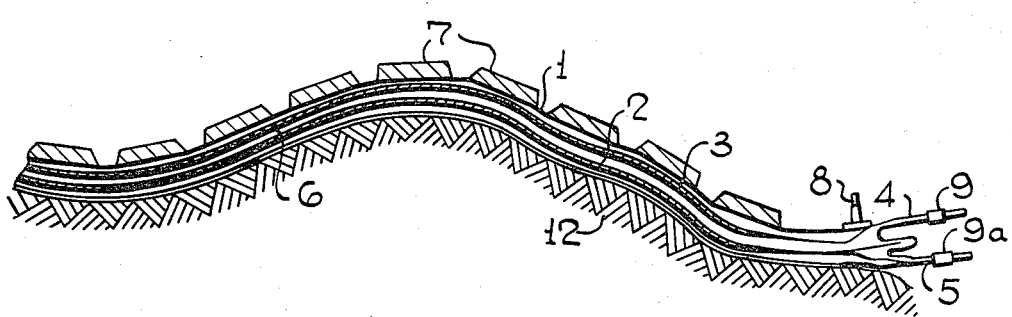
Fig. 2 is a sectional side view of the device showing the manner in which the device will conform to the contour of the earth's surface by virtue of its weight and continuity.

The natural vibrational frequency of the device should preferably be within the desirable range of about 4 to 40 cycles per second, and may be adjusted by varying the nature and thickness of the upper conductor layer 3, the thickness of the walls of tube 1, and the thickness of the elastic layer 6a when the latter is employed, or alternatively, the gas pressure within the tube when a gas is used as the elastic medium. In order to increase the sensitivity and adjust the natural frequency of the device, it is advisable to add weight to the upper wall of tube 1. For example, a series of plates 7 may be provided, suitably spaced from each other so as to allow for some bending of tube 1, as, for example, when the device is to be laid on uneven ground 12 as shown in Fig. 2. These plates may be made of metal, wood, hard rubber, plastic or other material of suitable mass.

The tube 1 may be of any desired length; e. g. from 10 to 100 feet or more and ordinarily will be about 20 to 50 feet in length. However, the length could also be equal to or greater than the normal distance between the geophone stations so that the effect of an infinite number of geophones laid side by side over the entire geophone spread could be obtained.

Conductor strips 2 and 3 are connected electrically to connector clips 9 and 9a by means of leads contained within flexible tubes 4 and 5 which are sealed to the top and bottom sides of tube 1. By means of leads 14 and 15, which may be attached to connectors 9, the device may be connected electrically into a circuit for detecting changes in capacitances of the condenser.

Figure 3:
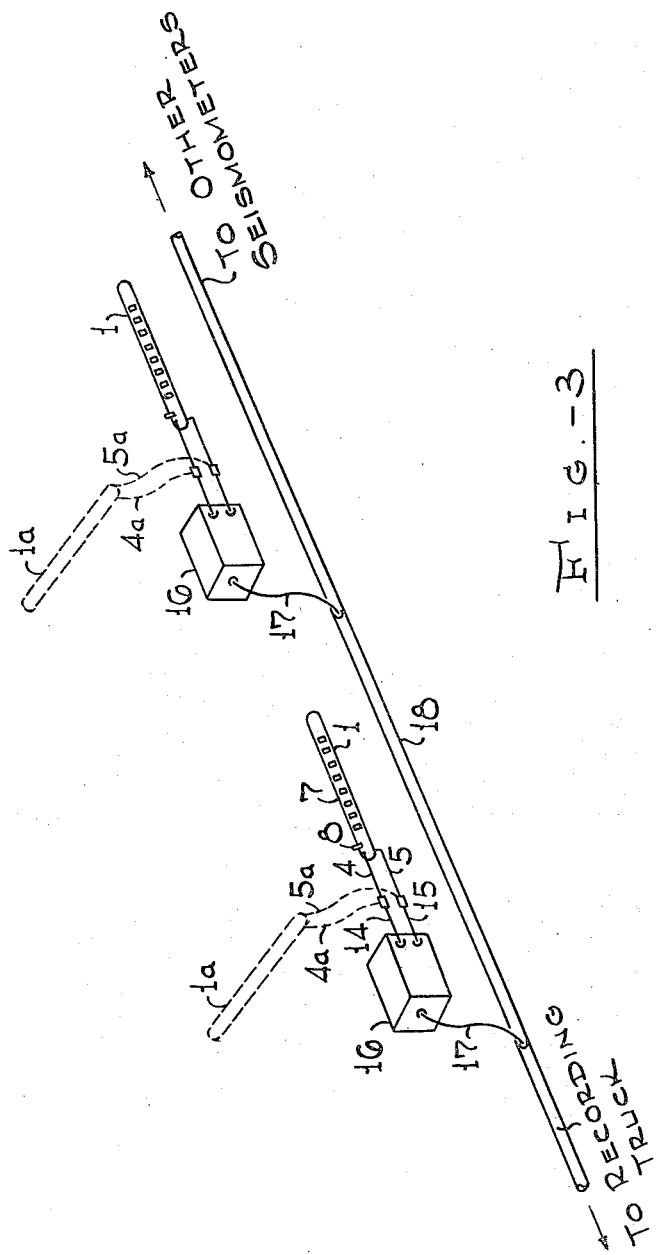
Fig. 3 is a schematic representation of two methods of laying out a spread of geophones in practicing this invention.

It will be seen from Figs. 1 and 2 that the seismometer of this invention comprises a capacitor made up of at least two flat elongated conductors arranged in essentially parallel planes on a flexible support but out of electrical contact with each other, so that when the device is laid out upon the ground the two conductors will be placed in motion relative to each other when a seismic disturbance reaches the device. This will cause the inherent capacity of the capacitor to change in relation to the change in distance between the two conductors. In order that a signal capable of being recorded by the instruments in the recording truck will be transmitted to the cable leading to the truck, it is necessary to convert this capacity change into a voltage change. This may be done, for example, by means of the electrical circuits shown in Figs. 4 and 5, as will be described more fully hereinafter. At least some of the elements of these circuits should preferably be placed adjacent to each seismometer. Fig. 3 shows diagrammatically a method of laying out the seismometers of this invention so that they will parallel the spread of the geophone stations. The capacitor device contained within tube 1 is laid out along the ground and leads 14 and 15 are connected into conversion unit 16 which is set on the ground along with the seismometer. The converted signal, obtained as a varying voltage in the circuit elements within 16, is transmitted through leads 17 to cable 18 and from there to the recording instruments in the recording truck.

If desired, each seismometer unit may be laid out perpendicular to the spread as also shown in Fig. 3 by the dotted outline 1a so that, in effect, wave fronts will be picked up circumferentially rather than radially with respect to the shot hole.

Figure 4:
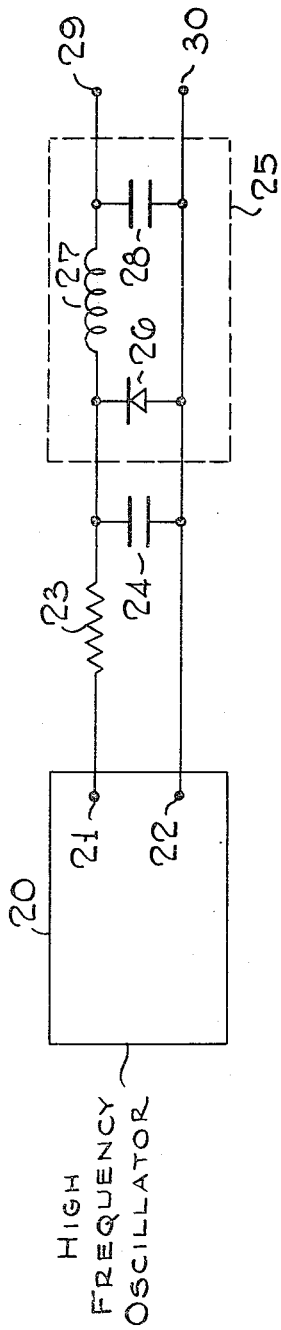
Fig. 4 is a schematic diagram of one electrical circuit that may be employed for converting changes in capacitance of the geophone device into corresponding voltage changes.

One suitable circuit for detecting changes in capacitance in the seismometer capacitor unit is shown in the circuit diagram of Fig. 4. A vacuum tube oscillator 20 is provided having output terminals 21 and 22. One plate of the capacitor of the seismometer unit, represented in Fig. 4 by numeral 24, is connected to terminal 22 and the other plate of the capacitor is connected through fixed resistor 23 to output terminal 21. The two plates of the capacitor 24 are also connected through a filter section 25 to terminals 29 and 30 which can be connected into cable 18 of Fig. 3, leading to the recording instruments on the truck. Oscillator 20 may be set up to produce an alternating current of 100 kilocycles, for example, and filter unit 25 will be designed to eliminate the 100 kilocycle frequency and to pass frequencies in the normal seismic range, i. e. about 10 to 100 cycles. Filter 25 comprises a rectifier unit 26, an inductance unit 27, and a capacitor 28.

As long as the capacity of capacitor 24 does not change, no voltage of seismic frequency will be produced across terminals 29 and 30. However, when the capacity of capacitor 24 is changed as, for example, when being disturbed by the receipt of a seismic impulse, a seismic frequency signal will be set up across terminals 29 and 30 which can be amplified and recorded by the conventional seismograph equipment. When utilizing the circuit of Fig. 4, oscillator 20, resistor 23 and filter 25 will be contained within unit 16 of Fig. 3.

Figure 5:
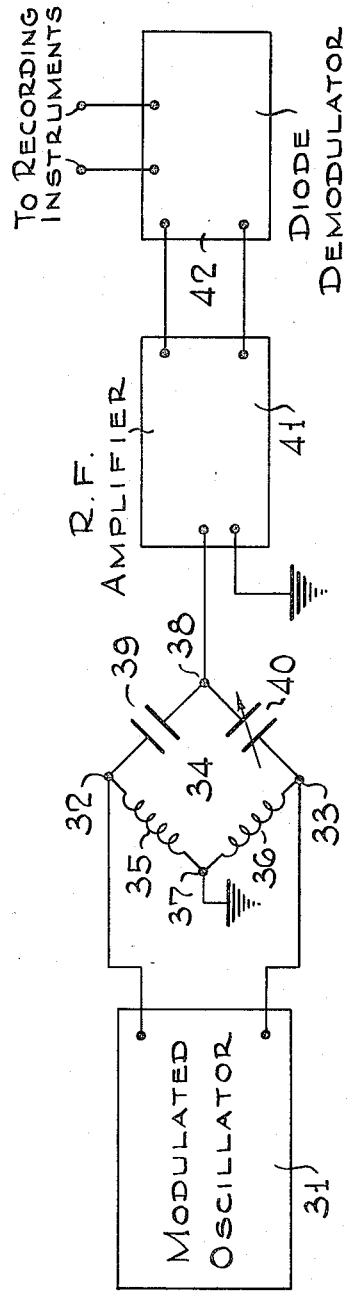
Fig. 5 is an alternative electrical circuit designed for greater sensitivity.

If greater sensitivity is desired, a circuit such as that depicted diagrammatically in Fig. 5 may be used. A modulated oscillator 31, which, for example, produces an alternating current of 500 kilocycles with a modulation of 500 cycles per second may be employed. The current from this oscillator is applied across terminals 32 and 33 of a balanced A. C. bridge circuit 34 comprising inductances 35 and 36 and capacitors 39 and 40, the latter being a variable capacitor whose capacitance may be adjusted to bring the bridge into balance, and 39 representing the capacitor comprising the two plates of the seismometer device depicted in Fig. 1. The bridge is balanced after the seismometer spread has been set out so that as the capacitance of 39 varies in accordance with the receipt of a seismic signal, the bridge becomes unbalanced, causing a variation in potential, produced at terminals 37 and 38 of the bridge circuit. This variation in potential is impressed on the control point of a radio frequency amplifier 41 and the amplified signal thus obtained is fed into diode demodulator 42 and then through cable 18 to the recording amplifier and recording instruments in the recording truck. A related circuit is described in Electronics, April 1949, page 126.

It is to be understood that the specific embodiments of the invention depicted in the foregoing description are by way of example only and are not intended to limit the scope of the invention, the same being limited only by the following claims.

What is claimed is:

1. Improved portable seismometer of the capacitor type comprising an elongated essentially flat flexible tube, an elongate thin flat flexible conductor carried by the bottom wall of said flexible tube, a second elongate thin flat flexible conductor carried by the top wall of said flexible tube out of electrical contact with said first conductor, an elastic non-conducting non-liquid medium disposed between said conductors, and a plurality of flat mass-providing plates carried by the top wall of said flexible tube.

2. Improved seismometer according to claim 1 in which said non-liquid elastic medium comprises a layer of sponge rubber.

3. Improved seismometer according to claim 1 in which said non-liquid elastic medium comprises a gas under pressure.

4. Improved seismometer according to claim 3 including a pressure valve in the wall of the tube to control the pressure of the gas.

WARREN A. ALEXANDER.

References Cited in the file of this patent
UNITED STATES PATENTS

| Number | Name | Date |
|---|---|---|
| 1,584,613 | Comstock et al. | May 11, 1926 |
| 2,257,187 | Owen | Sept. 30, 1941 |
| 2,272,984 | Ritzmann | Feb. 10, 1942 |
| 2,305,717 | La Bell | Dec. 22, 1942 |
| 2,408,478 | Petty | Oct. 1, 1946 |